Patented July 14, 1931

1,814,823

UNITED STATES PATENT OFFICE

DENIS JOSEPH BURKE, OF LONDON, ENGLAND, ASSIGNOR TO PHILIP SCHIDROWITZ, OF LONDON, ENGLAND

PAINT FOR APPLICATION TO RUBBER AND RUBBER SURFACES

No Drawing. Application filed May 15, 1928, Serial No. 278,054, and in Great Britain July 16, 1927.

This invention relates to paints for surface colouring rubber and rubber compounds.

It is frequently a difficulty in the case of rubber compounds which are naturally dark in colour owing to the presence in the compound of an ingredient or ingredients which are black, or otherwise dark in colour, as, for example, in the case of a compound where a large proportion of carbon black is incorporated as a reinforcing agent, to colour the compound to a desired shade, for to do so requires such a large amount of pigment that the physical properties of the compound are interfered with by the presence of the pigment. Such rubber compounds could be surface coloured, of course, by means of a paint, but hitherto no paint has been found which could be regarded as thoroughly satisfactory for the surface colouring of rubber and rubber compounds, especially where the rubber compound is in sheet form. The majority of known rubber paints have shown a marked tendency to become deleteriously affected by the atmosphere and the influence of sunlight, the rubber in the paint perishing and the paint disintegrating and cracking away from the painted rubber surface. This difficulty is accentuated in the case of painted rubber surfaces which are at all exposed to wear, and in the case of sheet rubber which in use is subjected to flexing to any material extent.

It has now been found, however, that a very satisfactory paint for application to the surface of rubber and rubber compounds may be produced by first forming a paste of the pigment of the paint by (a) dissolving a gum (e. g. wax-free shellac or a damar), with the aid, if necessary, of alcohol, in a low viscosity solution of nitro-cellulose or cellulose acetate (or like cellulose base) dissolved in a high boiling solvent, and (b) intimately mixing the resulting solution with a fine (e. g. colloidal) suspension of the pigment in a non-drying oil or in a liquid plasticizer (e. g. tri-cresyl-phosphate), and thereafter thinning the paste by adding to it a diluent composed of a liquid hydrocarbon such, for example, as toluene or xylene, the proportions in which the ingredients are used, and the manner in which they are brought together, being substantially as hereinafter set forth.

In the preparation of the paint it is preferred to introduce the pigment into a nitrocellulose or cellulose acetate solution in a condition of colloidal suspension, e. g. in the plasticizing medium. Preferably, a resin in solution is added e. g. shellac, or a damar, dissolved in an alcohol.

More specifically, the paint comprises (a) a pigment paste consisting of a pigment in a colloidal condition of subdivision suspended in a suitable vehicle which acts subsequently as a plasticizer to the paint and which preferably is a non-drying oil such as castor oil or a liquid such as tri-cresyl-phosphate.

(b) a low viscosity solution of nitro-cellulose, e. g. a 30% solution of low viscosity nitrated cotton dissolved in a suitable high boiling solvent such as ethyl lactate or ethyl benzoate, or a solution of cellulose acetate in a suitable solvent, (c) a small proportion of a gum, such as a wax-free shellac which is preferred, or a damar, in solution in an alcohol (for example amyl alcohol) to keep the shellac in solution, and (d) a suitable diluent for the product of mixing (a), (b) and (c) consisting e. g. of toluol, or xylol or/and benzol.

One method of preparing the paint which is done in the cold is as follows:—

(a) the pigment in finely divided form is introduced into a colloidal paint mill and ground into a colloidal condition in the presence of the vehicle until a paste results, (b) low viscosity nitrated cotton is dissolved in a high boiling solvent, e. g. ethyl lactate to form a 30% solution, (c) the gum is added in powder form to amyl alcohol and thereby becomes dissolved in the solution.

The paste of (a) and the product obtained by mixing (b) and (c) are then added together and intimately mixed, and the mixture of (a), (b) and (c) is then thinned out with the diluent.

*Example.*—(a) one-half pound of Prussian blue and 1½ lbs. of tri-cresyl-phosphate are thoroughly mixed together, ground once through a cone mill, and then ground as often as necessary (generally three times suffices) through a colloidal mill until the pigment and the vehicle are thoroughly mixed until a paste is formed, (b) 1⅕ lbs. of nitrated cotton are then dissolved in 2⅘ lbs. of ethyl lactate, and (c) ¼ lb. of shellac in powder form is added to 1 lb. of amyl alcohol. The paste of (a) is then added to and intimately mixed with the product obtained by mixing (b) and (c) and the resulting product is diluted with 2 lbs. of toluol. The whole is thoroughly mixed for two hours in a pebble mill to ensure smoothness.

It is important that the plasticizer, that is to say, the vehicle of the pigment, be present in an amount approximately equal to the total weight of the cotton and the gum. In no case should it be less than 75% by weight of the total weight of the cotton of the nitro-cellulose solution, otherwise the paint will be brittle and will crack off as known rubber paints have done.

In the case of a 30% cotton nitro-cellulose solution, the total amount of alcohol and hydrocarbon employed in the preparation of the paint should not exceed three times the weight of the cotton solvent, and the alcohol must constitute between 10 and 50% by weight of the total weight of the alcohol and hydrocarbon.

The proportion of pigment in the paste (a) varies according to requirements (covering power etc.).

If desired, the gum may be dissolved in the nitro-cellulose solution instead of in the alcohol, but the latter is the preferred mode in the case of intractable gums which require a lot of dissolving.

The application of the paint to the rubber sheet is all done in the cold, but if desired it can be done in the warm; the effect being simply a slight acceleration of the process.

Generally it is unnecessary to prepare the surface of the rubber sheet to receive the paint, but if necessary the surface can be brushed with some hydrocarbon solvent of the rubber.

It will be appreciated that the diluent is a cheap hydrocarbon and, moreover, is a solvent of rubber, so that when the paint is applied to the rubber sheet, the surface of the latter is slightly attacked and the result is that a perfect adherence is obtained of the colouring matter to the rubber sheet.

I claim:—

1. A process of manufacture of a paint for application to the surface of rubber, which process comprises the steps of grinding a pigment in a liquid plasticizer so as to form a dispersion of the pigment therein, dissolving a gum in a low-viscosity solution composed of a cellulose derivative dissolved in a high-boiling solvent, the amount of plasticizer used in the pigment dispersion being not less by weight than 75% of the weight of cellulose derivative employed in the cellulosic solution of gum, admixing the dispersion of pigment and the cellulosic solution of gum so as to form a homogeneous paste, and thereafter thinning the paste so formed by adding to it a diluent composed of a liquid hydrocarbon.

2. In a process of manufacture of a paint for application to the surface of rubber, which process comprises the steps of grinding a pigment in a liquid plasticizer, so as to form a dispersion of the pigment therein, dissolving a gum in a low-viscosity solution composed of a cellulose derivative dissolved in a high-boiling solvent, the amount of plasticizer used in the pigment dispersion being approximately equal by weight to the combined weight employed of the cellulose derivative and the gum, admixing the dispersion of pigment and the cellulosic solution of gum so as to form a homogeneous paste, and thereafter thinning the paste so formed by adding to it a diluent composed of a liquid hydrocarbon.

3. A process of manufacture of a paint for application to the surface of rubber, which process comprises the steps of grinding a pigment in tricresyl phosphate so as to form a dispersion of the pigment therein, dissolving a gum in a low-viscosity solution composed of a cellulose derivative dissolved in a high-boiling solvent, the amount of tricresyl phosphate used in the pigment dispersion being not less by weight than 75% of the weight of cellulose derivative employed in the cellulosic solution of gum, admixing the dispersion of pigment and the cellulosic solution of gum so as to form a homogeneous paste, and thereafter thinning the paste so formed by adding to it a diluent composed of a liquid hydrocarbon.

4. A process of manufacture of a paint for application to the surface of rubber, which process comprises the steps of grinding a pigment in a liquid plasticizer so as to form a dispersion of the pigment therein, dissolving a wax-free shellac in a low-viscosity solution composed of a cellulose derivative dissolved in a high-boiling solvent, the amount of plasticizer used in the pigment dispersion being not less by weight than 75% of the weight of cellulose derivative employed in the cellulosic solution of wax-free shellac, admixing the dispersion of pigment and the cellulosic solution of wax-free shellac so as to form a homogeneous paste, and thereafter thinning the paste so formed by adding to it a diluent composed of a liquid hydrocarbon.

5. A process of manufacture of a paint for application to the surface of rubber, which process comprises the steps of grinding a pigment in tricresyl phosphate so as to form a dispersion of the pigment therein, dissolving a wax-free shellac in a low-viscosity solution composed of cellulose nitrate dissolved in a high-boiling solvent, the amount of tricresyl phosphate used in the pigment dispersion being approximately equal by weight to the combined weight employed of the cellulose nitrate and the wax-free shellac, admixing the dispersion of pigment and the cellulosic solution of wax-free shellac so as to form a homogeneous paste, and thereafter thinning the paste so formed by adding to it a diluent composed of a liquid hydrocarbon.

6. A process of manufacture of a paint for application to the surface of rubber, which process comprises the steps of grinding a pigment in a liquid plasticizer so as to form a colloidal dispersion of the pigment therein, dissolving a gum with the aid of alcohol in a low-viscosity solution composed of cellulose nitrate dissolved in a high-boiling solvent, the amount of plasticizer used in the pigment dispersion being substantially equal by weight to the combined weight employed of the cellulose derivative and the gum, admixing the dispersion of pigment and the cellulosic solution of gum so as to form a homogeneous paste, and thereafter thinning the paste so formed by adding to it a diluent composed of a liquid hydrocarbon capable of solvent action upon rubber.

7. A process of manufacture of a paint for application to the surface of rubber, which process comprises the steps of grinding one part by weight of a pigment in approximately three parts by weight of tricresyl phosphate so as to form a colloidal dispersion of the pigment therein, dissolving approximately one and one-half parts of wax-free shellac with the aid of approximately two parts of alcohol in a low-viscosity solution composed of approximately two and one-half parts of cellulose nitrate dissolved in approximately five and one-half parts of a high-boiling solvent, admixing the dispersion of pigment and the cellulosic solution of gum so as to form a homogeneous paste and diluting the paste so formed with a hydrocarbon capable of slight action upon rubber.

In testimony whereof I affix my signature.

DENIS JOSEPH BURKE.